United States Patent
Harrod et al.

(10) Patent No.: US 8,332,075 B2
(45) Date of Patent: Dec. 11, 2012

(54) TRANSITION TEMPERATURE ADJUSTMENT USER INTERFACES

(75) Inventors: Gregory Ralph Harrod, Wichita, KS (US); Bradley A. Beers, Dorr, MI (US); Grant E. Carmichael, Grand Rapids, MI (US); Brian D. Rigg, Douglass, KS (US)

(73) Assignee: Johnson Controls Technology Company, Holland, MI (US)

( * ) Notice: Subject to any disclaimer, the term of this patent is extended or adjusted under 35 U.S.C. 154(b) by 506 days.

(21) Appl. No.: 12/560,238

(22) Filed: Sep. 15, 2009

(65) Prior Publication Data
US 2010/0070093 A1 Mar. 18, 2010

Related U.S. Application Data (60) Provisional application No. 61/097,133, filed on Sep. 15, 2008.

(51) Int. Cl.
*G05B 13/00* (2006.01)
*G05B 15/00* (2006.01)
*G05D 23/00* (2006.01)
*G06F 3/048* (2006.01)
*F28F 27/00* (2006.01)
*F25B 29/00* (2006.01)

(52) U.S. Cl. ........ 700/278; 700/276; 700/277; 715/833; 165/200; 165/201

(58) Field of Classification Search ............... None
See application file for complete search history.

(56) References Cited

U.S. PATENT DOCUMENTS

| | | | | |
|---|---|---|---|---|
| 4,555,764 | A | * | 11/1985 | Kuehn ........................ 700/299 |
| 5,259,445 | A | * | 11/1993 | Pratt et al. .................. 165/241 |
| 5,305,953 | A | | 4/1994 | Rayburn et al. |
| 5,402,845 | A | | 4/1995 | Jeffery et al. |
| 5,417,077 | A | | 5/1995 | Jeffery et al. |
| 5,417,368 | A | | 5/1995 | Jeffery et al. |
| 6,070,110 | A | | 5/2000 | Shah et al. |
| 6,155,341 | A | | 12/2000 | Thompson et al. |
| 6,449,533 | B1 | | 9/2002 | Mueller et al. |
| 6,619,555 | B2 | | 9/2003 | Rosen |
| 6,621,507 | B1 | | 9/2003 | Shah |
| 6,786,421 | B2 | * | 9/2004 | Rosen ........................... 236/94 |
| 6,824,069 | B2 | | 11/2004 | Rosen |
| 6,994,620 | B2 | | 2/2006 | Mills |
| 7,000,849 | B2 | | 2/2006 | Ashworth et al. |
| 7,017,827 | B2 | | 3/2006 | Shah et al. |
| 7,028,912 | B1 | * | 4/2006 | Rosen ......................... 236/1 C |
| 7,114,554 | B2 | | 10/2006 | Bergman et al. |
| 7,152,806 | B1 | | 12/2006 | Rosen |
| 7,156,316 | B2 | | 1/2007 | Kates |
| 7,188,002 | B2 | | 3/2007 | Chapman, Jr. et al. |
| 7,212,887 | B2 | | 5/2007 | Shah et al |
| 7,222,494 | B2 | | 5/2007 | Peterson et al. |
| 7,225,054 | B2 | | 5/2007 | Amundson et al. |

(Continued)

*Primary Examiner* — John R. Cottingham
*Assistant Examiner* — Sunray Chang
(74) *Attorney, Agent, or Firm* — Fletcher Yoder (57) ABSTRACT

Controllers for controlling heating, ventilating, air conditioning, and cooling (HVAC) systems are provided. The controllers include graphical user interfaces for user adjustment of system settings. The graphical user interfaces also may be designed to present information that facilitates user understanding of system operations. In certain embodiments, the controllers may allow users to adjust balance point and/or LTCO temperature values. In these embodiments, the graphical user interfaces may include slide bars for adjusting the balance point and/or LTCO temperature values.

25 Claims, 8 Drawing Sheets

U.S. PATENT DOCUMENTS

| | | |
|---|---|---|
| 7,232,075 B1 * | 6/2007 | Rosen .............................. 236/51 |
| 7,243,004 B2 | 7/2007 | Shah et al. |
| 7,287,709 B2 | 10/2007 | Proffitt et al. |
| 7,308,384 B2 | 12/2007 | Shah et al. |
| 7,364,353 B2 | 4/2008 | Kolk |
| 7,460,933 B2 | 12/2008 | Chapman, Jr. et al. |
| 2004/0117330 A1 * | 6/2004 | Ehlers et al. .................. 705/412 |
| 2004/0118933 A1 * | 6/2004 | Readio et al. ................. 237/2 B |
| 2005/0119766 A1 | 6/2005 | Amundson et al. |
| 2005/0234597 A1 * | 10/2005 | Harrod et al. ................. 700/276 |
| 2006/0192021 A1 | 8/2006 | Schultz et al. |
| 2007/0044501 A1 * | 3/2007 | Schnell et al. .................. 62/331 |
| 2008/0048046 A1 * | 2/2008 | Wagner et al. .............. 236/91 R |
| 2008/0211779 A1 * | 9/2008 | Pryor ............................ 345/173 |
| 2009/0090115 A1 | 4/2009 | Boydstun et al. |
| 2009/0171862 A1 * | 7/2009 | Harrod et al. ................. 705/412 |

* cited by examiner

TRANSITION TEMPERATURE ADJUSTMENT USER INTERFACES

CROSS REFERENCE TO RELATED APPLICATIONS

This application claims priority from and the benefit of U.S. Provisional Application Ser. No. 61/097,133, entitled "CONTROLLER AND ASSOCIATED USER INTERFACE FOR CLIMATE CONDITIONING SYSTEM", filed Sep. 15, 2008, which is hereby incorporated by reference.

BACKGROUND

The invention relates generally to heating, ventilating, air conditioning, and refrigeration systems, and controllers for configuring these systems.

A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

Residential systems generally include an indoor unit, such as an air handler or a furnace, and an outdoor unit, such as a heat pump or an air conditioner. A system controller, such as a thermostat, may be connected to control circuits within the indoor and outdoor units to control operation of the HVAC system. A user may adjust operating parameters of the HVAC system, such as the temperature of a heated or cooled space, through a user interface. However, in certain applications, the user interface may not allow for adjustment of more complex parameters. Further, a user may not understand how to adjust all but the simplest system parameters or how the components of the HVAC system function together.

SUMMARY

The present invention relates to a control device that includes a communication interface suitable for operable connection to a heat pump, an auxiliary heating system, and a sensor capable of sensing an exterior temperature. The control device also includes a display capable of displaying at least one system transition temperature, a graphical element that defines a range of possible system transition temperatures, and a moveable feature disposed on the graphical element. The control device further includes a graphical user interface capable of receiving a user input that moves the moveable feature on the graphical element to select the at least one system transition temperature from the range of possible system transition temperatures. The control device further includes a processor capable of selectively enabling the auxiliary heating system and the heat pump based upon the at least one selected system transition temperature and the sensed exterior temperature.

The present invention also relates to a control device that includes a communication interface suitable for operable connection to a heat pump, an auxiliary heating system, and a sensor capable of sensing an exterior temperature. The control device also includes a display capable of displaying a balance point temperature that corresponds to the exterior temperature below which the control device enables the auxiliary heating system, a low cutout temperature that corresponds to the exterior temperature below which the control device disables the heat pump, a slide bar that defines a range of possible balance point temperatures and a range of possible low cutout temperatures, a first moveable slider disposed on the slide bar to identify the balance point temperature, and a second moveable slider disposed on the slide bar to identify the low cutout temperature. The control device further includes a graphical user interface capable of receiving a first user input that moves the first moveable slider along the slide bar to select the balance point temperature from the range of possible balance point temperatures and a second user input that moves the second moveable slider along the slide bar to select the low cutout temperature from the range of possible low cutout temperatures. The control device further includes a processor capable of receiving the exterior temperature from the sensor and capable of selectively enabling the auxiliary heating system and the heat pump based upon the selected balance point temperature, the selected low cutout temperature, and the sensed exterior temperature.

The present invention further relates to a method that includes displaying a first moveable element on a range of selectable temperatures, displaying a second moveable element on the range of selectable temperatures, sensing a first touch that moves the first moveable element to select a balance point temperature from the range of selectable temperatures, sensing a second touch that moves the second moveable element to select a low cutout temperature from the range of selectable temperatures, and assigning the balance point temperature and the low cutout temperature to a heating system, wherein the heating system operates a heat pump and another heating device based upon the selected balance point temperature and the selected low cutout temperature.

The present invention further relates to a control device that includes a communication interface suitable for operable connection to a furnace and a sensor capable of sensing a fuel availability for the furnace, a processor capable of detecting a low fuel condition when the sensed fuel availability is below a predetermined level, and a display capable of displaying an alert that notifies a user of the low fuel condition.

The present invention further relates to a control device that includes a communication interface suitable for operable connection to a furnace and a sensor capable of sensing a fuel availability for the furnace, and a processor capable of detecting a low fuel condition when the sensed fuel availability is below a predetermined level and capable of enabling an alternate heating device in response to detecting the low fuel condition.

The present invention further relates to a method that includes determining an operating efficiency of an heating, ventilating, air conditioning, or cooling system, displaying the operating efficiency on a graphical user interface of a controller for the heating, ventilating, air conditioning, or cooling system, determining operating parameter adjustments for improving the operating efficiency, and displaying information describing the operating parameter adjustments on the graphical user interface.

DETAILED DESCRIPTION

The present disclosure is directed to controllers with user interfaces that facilitate programming of the controllers and/or HVAC system. In general, HVAC, systems, particularly those in colder climates, may include both a heat pump and an auxiliary heating system. The HVAC systems may transition between operation of the heat pump and the auxiliary heating system at one or more transition temperatures. For example, below a certain temperature, called in the present discussion the low temperature cutout (LTCO) (i.e., the low cutout temperature), it may be too cold for the heat pump to operate effectively. For example, the heat pump may not be able to provide enough heat to maintain a comfortable temperature within the home. Accordingly, when the outside temperature is below the LTCO temperature, it may be preferable that only the auxiliary heating system operates. When the outside temperature is above the LTCO temperature, the heat pump may operate as the primary heating source with the auxiliary heating system used to provide supplemental heating when needed to maintain the temperature set point within the home. When the temperature rises above a certain temperature, called in the present context the balance point, the auxiliary heating system may no longer be needed and the heat pump may provide all of the heat.

Rather than providing fixed or limited options for the LTCO setting and the balance point setting, the controller may allow a user to select between a range of LTCO and balance point settings. To implement the customizable LTCO and balance point settings, the controller may store the settings as register values in the corresponding control registries. The use of registry values, rather than the user of hardwired jumpers and/or DIP switch settings, may allow an increased number of LTCO and balance point settings to be provided and easily adjusted through the controller. In certain embodiments, the customization of LTCO and balance point settings may increase operating efficiency and reduce operating costs.

Figure 1:
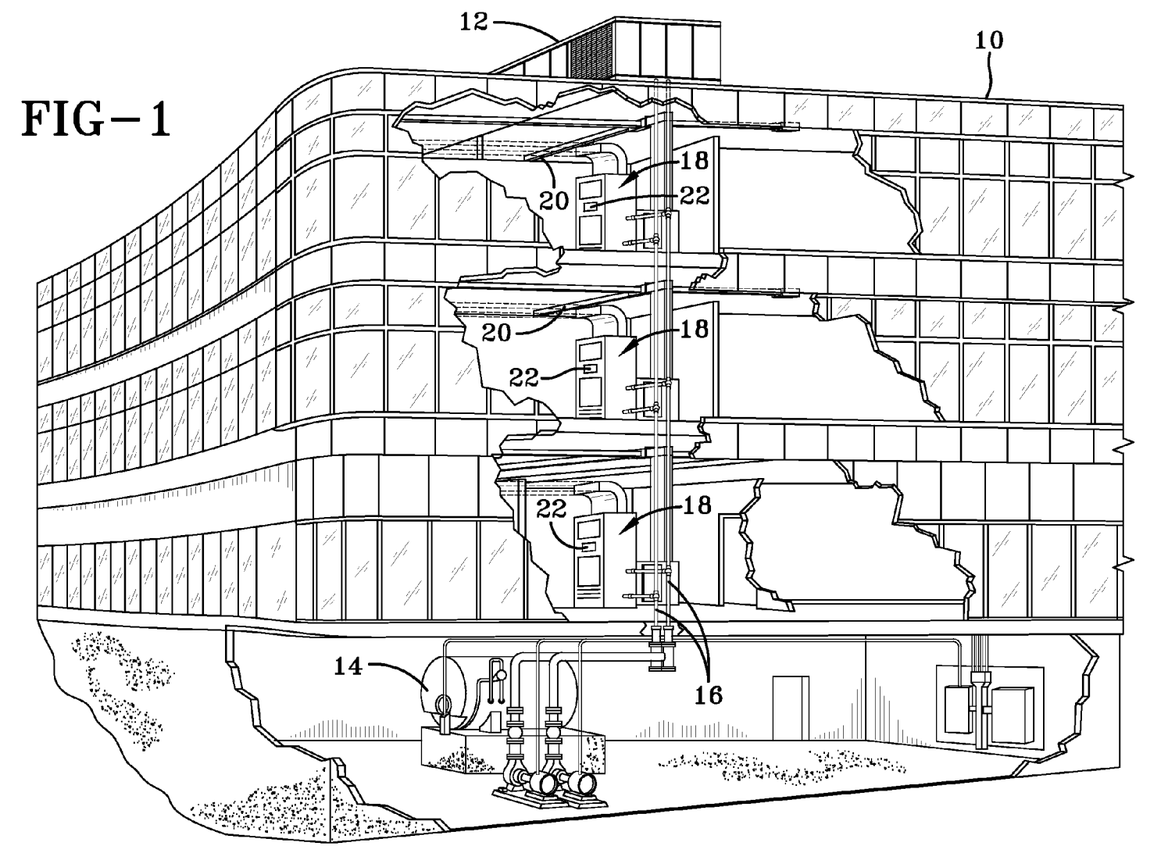
FIG. 1 is a perspective view of an embodiment of a commercial or industrial HVAC system that employs system controllers with user interfaces.

FIG. 1 illustrates an exemplary application, in this case an HVAC system for building environmental management, that may employ one or more system controllers with user interfaces. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments, or offices, to maintain the environments at a designated temperature. A controller 22, shown here as including a thermostat, may be used to designate the temperature of the conditioned air. Controller 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
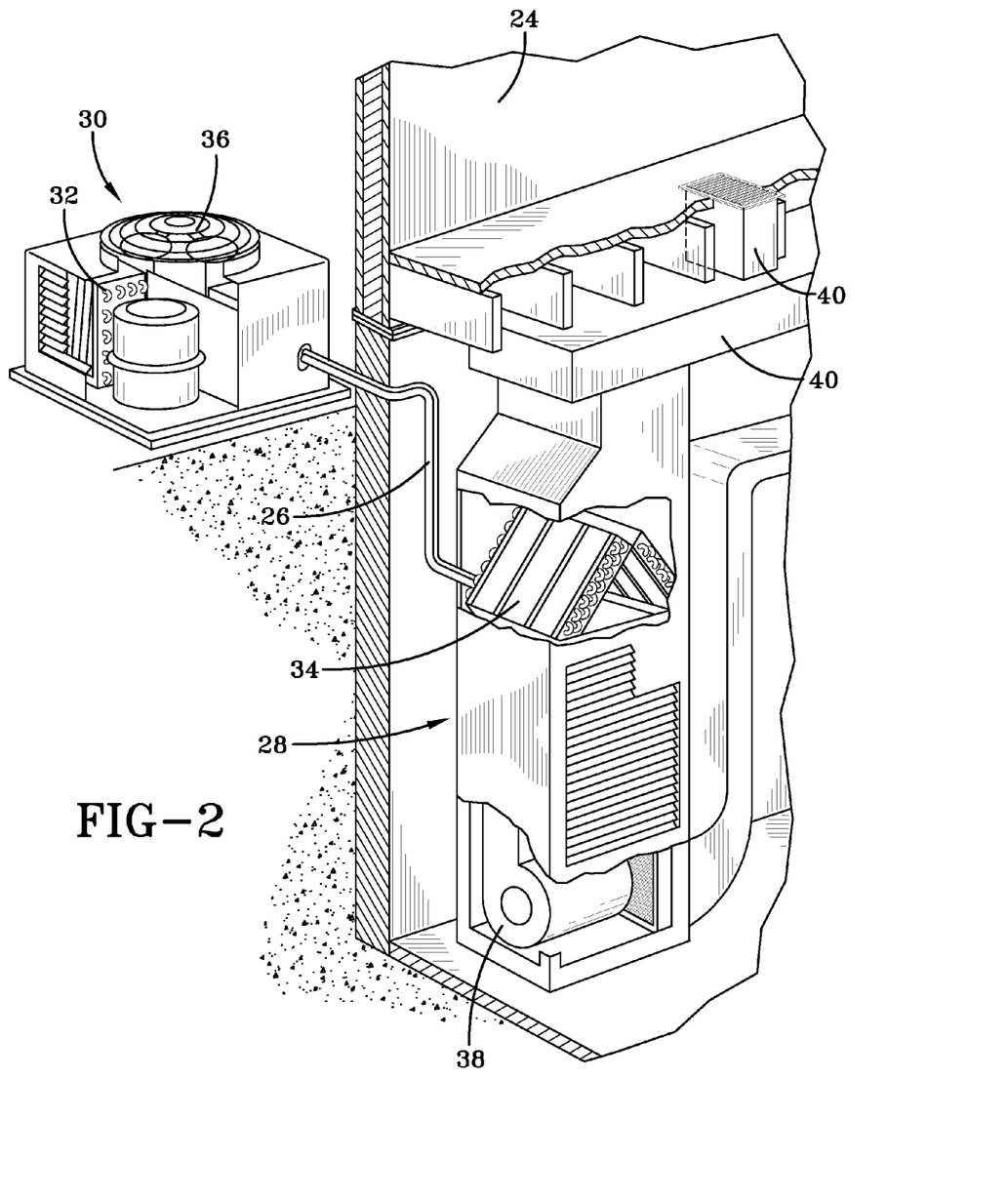
FIG. 2 is a perspective view of an embodiment of a residential HVAC system that employs system controllers with user interfaces.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 may include refrigerant conduits 26 that operatively couple an indoor unit 28 to an outdoor unit 30. Indoor unit 28 may be positioned in a utility room, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a heat exchanger 32 in outdoor unit 30 serves as a condenser for re-condensing vaporized refrigerant flowing from indoor unit 28 to outdoor unit 30 via one of the refrigerant conduits 26. In these applications, a heat exchanger 34 of the indoor unit functions as an evaporator. Specifically, heat exchanger 34 receives liquid refrigerant (which may be expanded by an expansion device, not shown) and evaporates the refrigerant before returning it to outdoor unit 30.

Outdoor unit 30 draws environmental air through heat exchanger 32 using a fan 36 and expels the air above the outdoor unit. When operating as an air conditioner, the air is heated by heat exchanger 32 within outdoor unit 30 and exits the unit at a temperature higher than it entered. Indoor unit 28 includes a blower or fan 38 that directs air through indoor heat exchanger 34, where the air is cooled when the system is operating in air conditioning mode, and then circulates the air through ductwork 40 that directs the air to the residence 24. The overall system operates to maintain a desired temperature as set by a system controller 22 (FIG. 1). When the temperature sensed inside the residence is higher than the set point on the thermostat (plus a small amount), the air conditioner may become operative to refrigerate additional air for circulation through the residence. When the temperature reaches the set point (minus a small amount), the unit may stop the refrigeration cycle temporarily.

When the unit in FIG. 2 operates as a heat pump, the roles of heat exchangers 32 and 34 are reversed. That is, heat exchanger 32 of outdoor unit 30 will serve as an evaporator to evaporate refrigerant and thereby cool air entering outdoor unit 30 as the air passes over outdoor heat exchanger 32. Indoor heat exchanger 34 will receive a stream of air blown over it and will heat the air by condensing the refrigerant.

Figure 3:
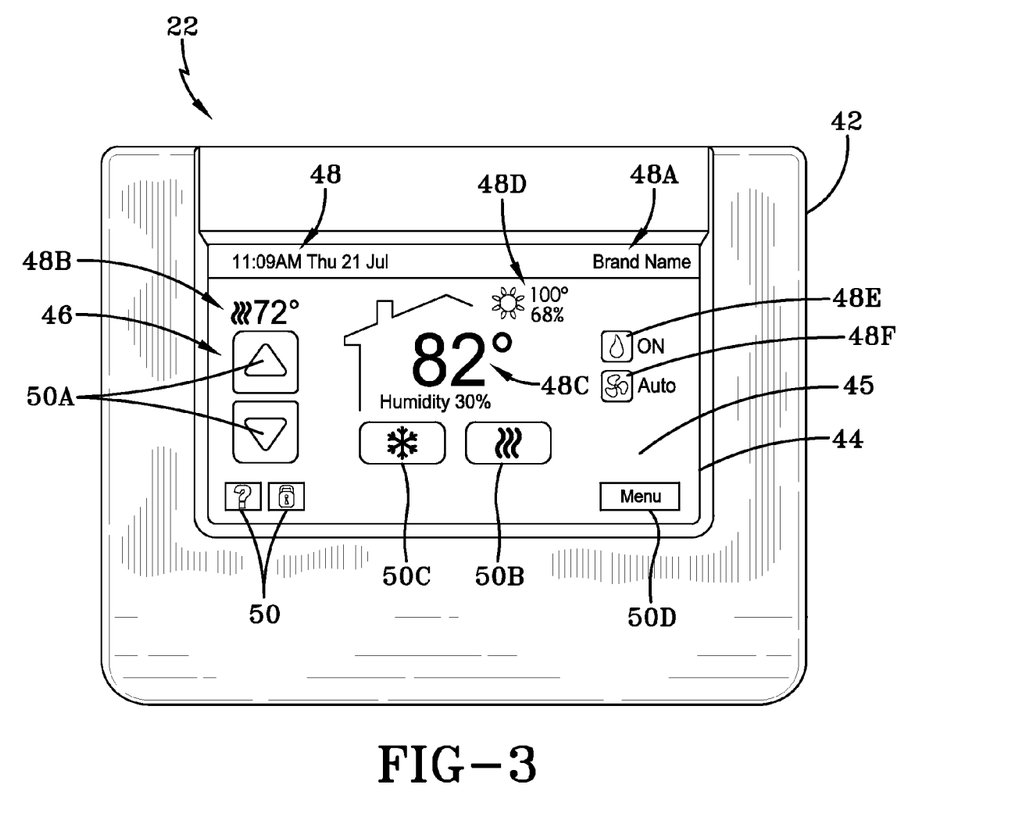
FIG. 3 is a perspective view of an embodiment of a system controller for an HVAC system.

FIG. 3 is a front view of controller 22, shown here as including a digital programmable thermostat. In other embodiments, the controller may be any suitable temperature controller. The controller 22 may be used to control one or more indoor and/or outdoor units. Controller 22 is protected by an enclosure 42 that protects the interior components from physical damage and shields them from environmental hazards such as dust and electromagnetic interference. The enclosure may be formed from any suitable material such as plastic, metal, or a composite material. A display 44 is mounted within enclosure 42 and may be used to display various images and text generated by the device. The display may be any type of display such as a liquid crystal display, a light emitting diode display, an organic light emitting diode display, or other suitable display and may be capable of displaying text strings and/or high-resolution color graphics. Additionally, the display includes a touch-sensitive element, such as a touch screen 45.

Touch screen 45 may receive input from a user's or object's touch and may send the information to a processor within the controller 22, which may interpret the touch event and perform a corresponding action. According to certain embodiments, the touch screen may employ resistive touch screen technology. However, in other embodiments, the touch screen may employ any suitable type of touch screen technology, such as capacitive, infrared, surface acoustic wave, electromagnetic, or near field imaging. Furthermore, touch screen 45 may employ single point or multipoint sensing.

Display 44 may be used to display a graphical user interface (GUI) 46 that allows a user to interact with the controller. GUI 46 may include various layers, windows, screens, templates, elements, or other components that may be displayed in all, or a portion, of display 44. Generally, GUI 46 may include textual and graphical elements that represent applications and functions of controller 22. For example, user GUI 46 may include status indicators 48 that display the status of the system and/or the environment. For example, an indicator 48B may display the operational mode (i.e., heating or cooling) and the temperature set point, an indicator 48C may display the current temperature and humidity, and an indicator 48D may display the weather conditions, among others. In another example, indicators 40E and 40F may display the humidity control status and the fan speed, respectively. In certain embodiments, the status indicators 48 also may include one or more brand indicators 48A that display information identifying the brand of controller 22.

GUI 46 also may include graphical elements 50 that may represent icons, buttons, sliders, menu bars, and the like. Graphical elements 50 may be selected by a user through the touch screen. For example, graphical elements 50A may be selected to increase or decrease the temperature set point. In another example, graphical elements 50B and 50C may be selected to change the system mode between heating and cooling. A graphical element 50D also may be selected by a user to display screens with menus and/or submenus for adjusting system settings and/or operation parameters of the HVAC system. Further, a graphical element 50E may notify a user that maintenance is required and may be selected to obtain maintenance information. As may be appreciated, the types and functionality of the graphical elements may vary depending on system functionality, system settings, and system equipment, among others. Further, in certain embodiments, controller 22 may include physical inputs, such as buttons, wheels, knobs, or the like, for receiving user input instead of, in addition to, or in combination with graphical elements 50.

Figure 4:
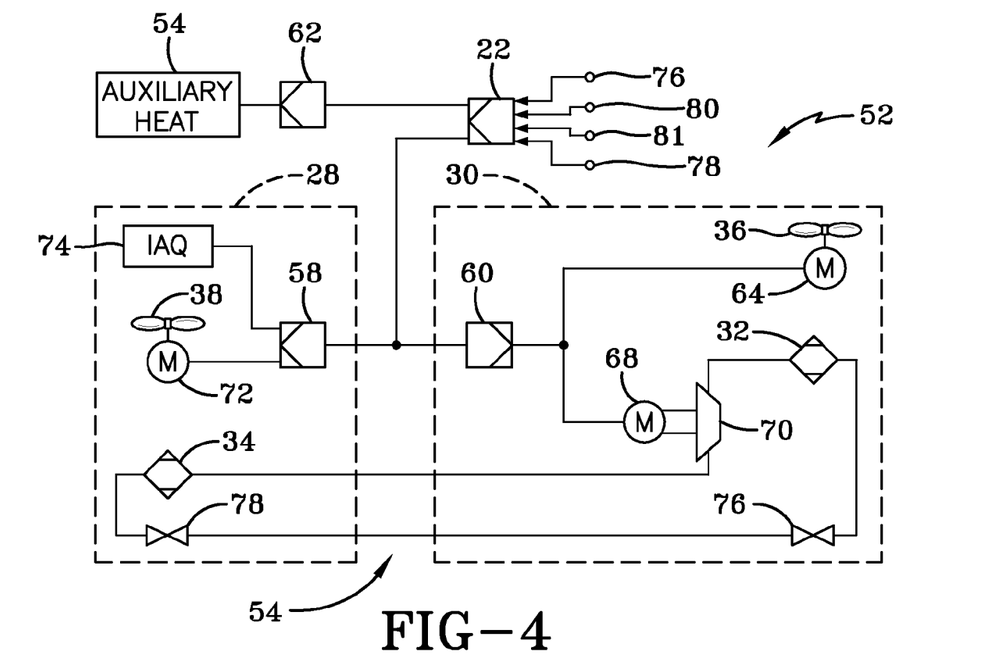
FIG. 4 is a block diagram of an embodiment of an HVAC system that employs a system controller.

FIG. 4 is a block diagram of an HVAC system 52 that includes controller 22, indoor unit 28 functioning as an air handler, and outdoor unit 30 functioning as a heat pump. Refrigerant flows through system 52 within a closed refrigeration loop 54 between outdoor unit 30 and indoor unit 28. The refrigerant may be any fluid that absorbs and extracts heat. For example, the refrigerant may be hydrofluorocarbon (HFC) based R-410A, R-407C, or R-134a. HVAC system 52 also includes an auxiliary heat system 56 that may be used to provide additional heating. For example, auxiliary heat system 56 may include a gas furnace, a fossil fuel furnace, an electric heat system, or the like.

The operation of indoor and outdoor units 28 and 30 is controlled by control circuits 58 and 60, respectively. Further, the operation of auxiliary heat system 56 is controlled by a control circuit 62. Control circuits 58, 60, and 62 may execute hardware or software control algorithms to govern operations of HVAC system 52. According to certain embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications. Further, in certain embodiments, the control circuits may be controlled through a wireless network.

Control circuits 58, 60, and 62 may receive control signals from controller 22 and transmit the signals to equipment located within indoor unit 28, outdoor unit 30, and auxiliary heat system 54. For example, outdoor control circuit 60 may route control signals to a motor 64 that powers fan 66 and to a motor 68 that powers a compressor 70. Indoor control circuit 58 may route control signals to a motor 72 that powers fan 38. Indoor control circuit 58 also may route control circuits to equipment included within an Indoor Air Quality (IAQ) system 74. For example, IAQ system 74 may include one or more air cleaners, UV air purifiers, humidifiers, and/or ventilators, among others. The control circuits also may transmit control signals to other types of equipment such as valves 76 and 78, sensors, and switches.

Controller 22 may operate to control the overall heating and cooling provided by indoor unit 28, outdoor unit 30, and auxiliary heat system 54. Indoor and outdoor units 28 and 30 include heat exchangers 34 and 32 that function either as an evaporator or a condenser depending on the heat pump operation mode. For example, when HVAC system 52 is operating in cooling (or "AC") mode, outside heat exchanger 32 functions as a condenser, releasing heat to the outside air, while inside heat exchanger 34 functions as an evaporator, absorbing heat from the inside air. When HVAC system 52 is operating in heating mode, outside heat exchanger 32 functions as an evaporator, absorbing heat from the outside air, while inside heat exchanger 34 functions as a condenser, releasing heat to the inside air. A reversing valve (not shown) may be positioned on closed loop 54 to control the direction of refrigerant flow and thereby to switch the heat pump between heating mode and cooling mode.

HVAC system 52 also includes two metering devices 76 and 78 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when HVAC system 52 is operating in cooling mode, refrigerant bypasses metering device 76 and flows through metering device 78 before entering inside heat exchanger 34, which acts as an evaporator. In another example, when HVAC system 52 is operating in heating mode, refrigerant bypasses metering device 78 and flows through metering device 76 before entering outside heat exchanger 32, which acts as an evaporator. According to other exemplary embodiments, a single metering device may be used for both heating mode and cooling mode.

The refrigerant enters the evaporator, which is outside heat exchanger 32 in heating mode and inside heat exchanger 34 in cooling mode, as a low temperature and pressure liquid. Some vapor refrigerant also may be present as a result of the expansion process that occurs in metering device 76 and 78. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 70. Compressor 70 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 70, the increased temperature and pressure vapor refrigerant flows into a condenser, the location of which is determined by the heat pump mode. In cooling mode, the refrigerant flows into outside heat exchanger 32 (acting as a condenser). Fan 36, which is powered by motor 64, draws air across the tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside heat exchanger 34 (acting as a condenser). Fan 38, which is powered by motor 72, draws air across the tubes containing refrigerant vapor. The heat from the refrigerant is transferred to the inside air causing the refrigerant to condense into a liquid.

After exiting the condenser, the refrigerant flows through the metering device (76 in heating mode and 78 in cooling mode) and returns to the evaporator (outside heat exchanger 32 in heating mode and inside heat exchanger 34 in cooling mode) where the process begins again.

In both heating and cooling modes, motor 68 drives compressor 70 and circulates refrigerant through reversible refrigeration/heating loop 54. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 68 is controlled by control circuit 60. Control circuit 46 may receive control signals from controller 22. In certain embodiments, controller 22 may receive information from a sensor 76 that measures the ambient indoor air temperature and a sensor 78 that measures indoor humidity. Controller 22 then compares the air temperature to the temperature set point (which may be input by a user) and engages compressor motor 68 and fan motors 64 and 72 to run the cooling system if the air temperature is above the temperature set point. In heating mode, controller 22 compares the air temperature from sensor 76 to the temperature set point and engages motors 64, 68, and 72 to run the heating system if the air temperature is below the temperature set point. According to certain embodiments, sensors 76 and 78 may be located within and/or may be an integral part of controller 22. However, in other embodiments, sensors 76 and 78 may be external devices connected to controller 22, for example, through a wired or wireless connection.

Control circuit 60 and controller 22 also may initiate a defrost cycle when the system is operating in heating mode. When the outdoor temperature approaches freezing, moisture in the outside air that is directed over outside heat exchanger 32 may condense and freeze on the coil. Controller 22 may receive information from one or more sensors 80 that measure the outside air temperature and, in certain embodiments, the temperature of outside heat exchanger 32. These sensors provide temperature information to the control circuit 60 which determines when to initiate a defrost cycle.

Controller 22 also may use temperature information from outdoor temperature sensor 80 to determine when to enable the auxiliary heating system 54. For example, if controller 22 receives a signal from temperature sensor 80 indicating that the outdoor temperature has dropped below a certain set point, controller 22 may disable operation of indoor unit 28 and outdoor unit 30 and enable auxiliary heating system 54. In certain embodiments, HVAC system 52 also may include a sensor 81 that senses the level of fuel within a fuel source for auxiliary heating system 54. For example, auxiliary heating system 54 may be a furnace that uses fuel from a propane tank. In this example, sensor 81 may measure the level of fuel within the propane tank and may provide this information to controller 22. Controller 22 may then determine when to operate auxiliary heating system 54, based at least in part on the fuel information provided by sensor 81. For example, if the fuel level is low, controller 22 may operate indoor and outdoor units 28 and 30 for heating, rather than operating auxiliary heating system 54. Further, in certain embodiments, depending on the outdoor temperature, among other factors, controller 22 may operate the auxiliary heating system 54 in conjunction with indoor unit 28 and outdoor unit 30.

Figure 5:
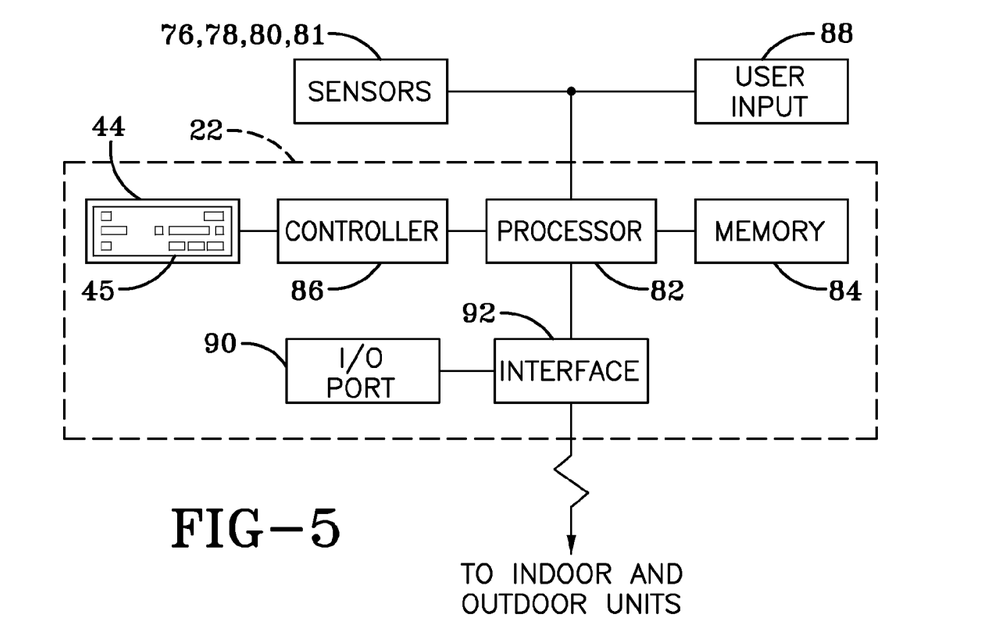
FIG. 5 is a block diagram of an embodiment of a system controller.

FIG. 5 is a simplified block diagram illustrating various components and features of controller 22 in accordance with one embodiment. The block diagram includes display 36 discussed above with respect to FIG. 3, as well as many other components. As noted above with respect to FIG. 4, the controller 22 may be used to control operation of an HVAC system with one or more indoor and outdoor units, such as indoor unit 28, outdoor unit 30, and auxiliary heating system 54. In certain embodiments, each of the units may include a control circuit communicatively coupled to the controller. However, in other embodiments, only some of the units may include control circuits, and the units without control circuits may be wired to and controlled by control circuits within the other units and/or by the controller.

The operation of controller 22 may be controlled by a processor 82 that provides the processing capability for the controller. In certain embodiments, the processor 82 may include one or more microprocessors, instruction set processors, graphics processors, and/or related chip sets. Processor 82 may cooperate with a memory 84 that stores executable and/or machine-readable code, data, and instructions for processor 82. For example, the memory 84 may store look up tables and/or algorithms for GUI 46 (FIG. 3). Memory 84 also may store protocol information and instructions for allowing communication between controller 22 and connected units. The memory may include volatile memory such as random access memory and/or non-volatile memory such as read only memory, flash memory, a hard drive, or any other suitable optical, magnetic, or solid-state computer readable media, as well as a combination thereof.

Memory 72 also may store components of GUI 46 (FIG. 3), such as graphical elements, screens, and templates, that may be shown on display 44. A controller 86 may provide the infrastructure for exchanging data between processor 82 and display 44. According to certain embodiments, controller 86 may be an integrated circuit. Further, controller 86 may exist as a separate component or be integrated into display 44 or processor 82. According to exemplary embodiments, controller 86 may govern operation of display 44 and may process graphics and text for display on display 44. Further, controller 86 may process touch events received through the touch screen of display 44.

Display 44 may display screens of GUI 48 prompting a user to enter a user input 88 through touch screen 45. User input 88 may include a value specifying properties of the HVAC system. For example, a screen may prompt a user to select one of the graphical elements 50 to adjust a temperature set point or to determine the heating or cooling mode. In another example, display 44 may display setup screens prompting a user to input a schedule for the HVAC system.

User input 88 also may be received through an input/output (I/O) port 90. The I/O port may be a serial port, USB port, media card port, IEEE-1394 port, network interface, or other suitable interface configured to receive input from an external device. For example, the I/O port may be a USB port for connecting to a USB drive or flash drive. In certain embodiments, the I/O port may be a wireless interface for connecting to a computer, cell phone, or personal navigation device over a wireless network, such as an IEEE 802.11x wireless network. Moreover, in certain embodiments, screens of GUI 46 may be transmitted through I/O port 90 to an external device, such as a cell phone or computer, to facilitate control of controller 22 through the external device.

A communication interface 92 may transmit information received through I/O port 90 to processor 82. In certain embodiments, communication interface 92 may process data prior to transmitting the data to processor 82. Communication interface 92 also may provide an infrastructure for communicating information from I/O port 90 and processor 82 to the indoor and outdoor units 28, 30, 54, 74 (FIG. 4) within the HVAC system. In certain embodiments, the communication interface may be a serial communication interface including one or more protocols for transmitting and/or receiving communication packets containing control signals. For example, the communication interface may employ one or more protocols such as Modbus, BACnet, DNET, or PROFIBUS (Process Field Bus). In certain embodiments, the communication interface may include a Controller Area Network (CAN) chip for communicating with the indoor and outdoor units, with the auxiliary heating system, and/or with external devices. According to exemplary embodiments, communication interface 92 may employ packet switching to route communication packets to the indoor and outdoor units and to the auxiliary heating system. Further, in certain embodiments, communication interface 92 may communicate with external servers, devices, and/or systems. For example, communication interface 92 may connect through a network to a weather information provider to obtain weather forecast and/or real time information.

Figure 6:
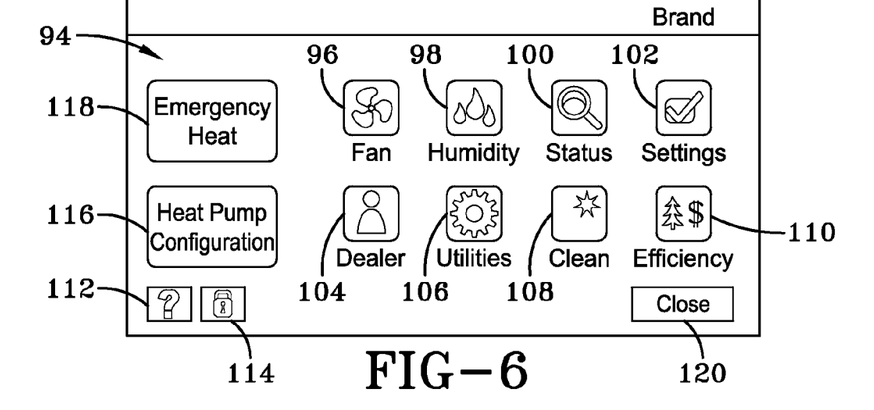
FIG. 6 is a view of a menu screen of the controller of FIG. 5.

FIG. 6 depicts a menu screen 94 of GUI 46 for changing or initially entering settings of HVAC system 52. In certain embodiments, screen 94 may be displayed by selecting the menu graphical element from the home screen as shown in FIG. 3. Screen 94 includes graphical elements 96, 98, 100, 102, 104, 106, 108, and 110 that may be selected by a user through touch screen 45 to display various screens and sub-menus of GUI 46 for adjusting settings and/or operating parameters. For example, a user may select one of the graphical elements 96, 98, 100, 102, 104, or 106 to display a menu for adjusting fan settings, humidity settings, system status settings, general settings, dealer information, or system utilities. A user may select graphical element 108 to view a screen that may facilitate cleaning of display 44. In another example, a user may select graphical element 110 to view screens describing the operating efficiency of HVAC system 52. In certain embodiments, graphical element 110 may be selected to display screens that assist a user in increasing the efficiency of HVAC system 52. Screen 104 also includes graphical elements 112 and 114 that may be selected to view other screens of GUI 48, such as a help screen and a password or personal identification number (PIN) screen for controlling access to controller 22.

Screen 94 further includes graphical elements 116 and 118 that may be selected to specify heating parameters for HVAC system 52. HVAC system 52 may include two separate heating sources. For example, when the outside temperature is above a specified temperature, referred to as the balance point temperature, heating may be provided by outdoor unit 30 (FIG. 4), functioning as a heat pump. However, when the outside temperature is below a specified temperature, referred to as the LTCO temperature, the heat pump may not be able to provide enough heat to maintain a comfortable temperature inside the home. Accordingly, heating may be provided by auxiliary heating system 54, which may include an electric or gas furnace. In certain embodiments, auxiliary heating system 54 may be fueled by fuel, such as propane, stored within an outdoor storage tank.

Graphical elements 116 and 118 may facilitate control of the two heat sources. Specifically, graphical element 116 may be selected to display menus for adjusting the balance point temperature and the LTCO temperature. Graphical element 118 may be selected to override current system settings and provide emergency heat using auxiliary heating system 54. Menu screen 104 also includes a graphical element 120 that may be selected to close the menu screen and return to the home screen shown in FIG. 3.

Figure 7:
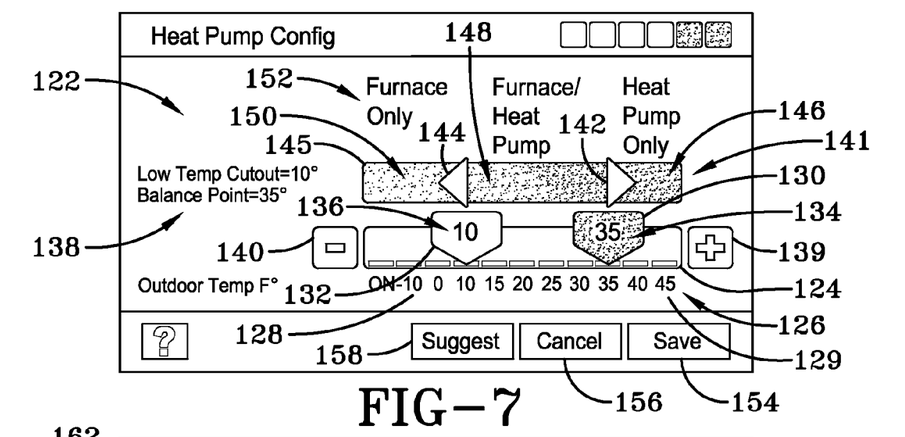
FIG. 7 a view of a screen of the controller of FIG. 5 with a slide bar for adjusting system transition temperatures.

FIG. 7 depicts a screen that may be employed by a user to adjust system transition temperatures including the LTCO temperature and the balance point temperature. Screen 122 includes a graphical element, such as slide bar 124, of incremental temperature values 126 that may be selected as the LTCO temperature and the balance point temperature. The temperature values 126 may extend between a minimum temperature 128 and a maximum temperature 129 with incremental temperature values spaced therebetween. According to certain embodiments, the temperature values 126 may be spaced by five degree increments (on either the Fahrenheit or Celsius scale, which may also be selected in certain embodiments). However, in other embodiments, the incremental values may vary, for example, being spaced apart by approximately one to ten degrees. The maximum and minimum values 128 and 129 may be based on factors such as the equipment models included within HVAC system 52, installer settings, and/or factory settings, among others. Further, in certain embodiments, the maximum and minimum values 128 and 129 may be based on the geographical location of HVAC system 52. In certain embodiments, tables and/or algorithms correlating the HVAC system conditions to maximum and minimum temperature values may be stored within memory 84 (FIG. 5). Further, in certain embodiments, the maximum and minimum temperature values may be received through communication interface 92 and/or through I/O port 90, as shown in FIG. 5.

Screen 122 includes moveable features, such as sliders 130 and 132 that may be moved along slide bar 124 to adjust the LTCO temperature set point and the balance point temperature set point. Specifically, slider 130 may be moved along slide bar 124 to specify the balance point temperature, and slider 132 may be moved along slide bar 124 to specify the LTCO temperature. Each slider 130 and 132 includes an indicator 134 and 136 that displays the currently selected temperature value. A summary section 138 of screen 122 may also display the LTCO and balance point temperatures. A user may touch and drag sliders 130 and 132 along slide bar 124 until the desired setting is reached. In addition to sliders 130 and 132, a user may select graphical elements 139 and 140 to incrementally increase or decrease the selected values. For example, a user may tap slider 130 to select slider 130 for adjustment. A user then may tap graphical elements 139 and 140 to increase or decrease the balance point temperature. In response to selection of graphical elements 139 and 140, the designated slider 130 or 132 may move accordingly to reflect the adjusted temperature setting. For example, in response to selection of graphical element 139, controller 22 may move slider 130 or 132 to the right to increase the temperature setting by one increment. In response to selection of graphical element 140, controller 22 may move slider 130 or 132 to the left to decrease the temperature setting by one increment. Further, in certain embodiments, GUI 46 may include a keypad that facilitates entry of the desired settings. For example, a user may select and hold down slider 130 or 132 for a set period of time to display a popup keypad with touch sensitive keys that a user may select to enter the desired settings.

Screen 122 includes an explanation area 141 that may assist the user in setting the balance point and LTCO temperatures. Explanation area 141 includes arrows 142 and 144 that move along a slide bar 145 that generally corresponds to slide bar 124. As a user moves sliders 130 and 132 along slide bar 124, arrows 142 and 144 may move along slide bar 145 in a corresponding direction by a corresponding amount. Arrows 142 and 145 divide slide bar 145 into three regions 146, 148, and 150. Indicators 152 are shown above each region 146, 148, and 150 and may identify the heating source enabled by controller 22 when the exterior temperature falls within that region.

Indicators 152 may generally assist a user in understanding the operation of HVAC system 52. For example, HVAC system 52 may operate in region 146 when the exterior temperature is above the balance point temperature indicated by slider 130 and arrow 142. Indicator 152 may notify a user that when HVAC system 52 operates in region 146, only the heat pump may be used for heating. HVAC system 52 may operate in region 150 when the exterior temperature is below the LTCO temperature indicated by slider 132 and arrow 144. Indicator 152 may notify a user that when HVAC 52 operates in region 150, only the furnace (i.e. auxiliary heating system 54), may be used for heating. An intermediate region 148 exists between regions 146 and 150. HVAC system 52 may operate in region 148 when the external temperature is in between or at the LTCO and balance point temperatures. Indicator 152 may notify a user that when HVAC system 52 operates in region 148, both the furnace and heat pump may be used for heating. According to certain embodiments, when HVAC system 52 operates within region 148, the outdoor unit 30 may be used as the primary heat source with the auxiliary heating system 54 providing supplemental heat. However, in other embodiments, controller 22 may operate one or both of outdoor unit 30 and auxiliary heating system 54 when the exterior temperature falls within region 148.

In certain embodiments, controller 22 may implement control logic via processor 82, which may be stored in memory 84, to facilitate user selection of appropriate values for the balance point temperature and the LTCO temperature. For example, controller 22 may prevent a user from moving slider 130 to a temperature lower than the temperature presently indicated by slider 132. In another example, controller 22 may ensure that region 148 occupies at least a minimum temperature range. For example, controller 22 may ensure that a temperature difference of at least three degrees exists between the balance point temperature and the LTCO temperature. Processor 82 may calculate the difference between the balance point temperature and the LTCO temperature and may ensure that the difference exceeds a predetermined value that defines the size of the temperature range in region 148. In certain embodiments, the minimum temperature range, or deadband, may reduce periodic switching between operation of the heat pump and the furnace.

Slide bar 124, sliders 130 and 132, and explanation area 141 may generally facilitate visualization and understanding of how the balance point temperature and the LTCO temperature interact with each other and with components of HVAC system 52. For example, explanation area 141 may facilitate understanding of how HVAC system 52 may enable and disable heat pump 30 and auxiliary heating system 54 based on the outside or exterior temperature. In another example, sliders 130 and 132 and corresponding arrows 142 and 144 may facilitate user understanding of how the balance point temperature is greater than the LTCO temperature. Further, in other embodiments, screen 144 may only show one of the sliders. For example, certain controllers may facilitate adjustment of only the balance point temperature or the LTCO temperature.

When a user has finished selecting the desired temperature values for the balance point temperature and the LTCO temperature, a user may select a graphical element 154 to save the changes. If a user wishes to cancel the changes, a user may select a graphical element 156. Controller 22 may then apply the temperature settings to HVAC system 52. For example, as shown in FIG. 5, controller 22 may store the new settings in a corresponding control registry of controller 22. Further, in certain embodiments, the controller may send the registry values to control circuit 58, 60, or 62 for backup storage. For example, controller 22 may send the registry values for the LTCO temperature and balance point temperatures to control circuit 62 of auxiliary heating system 54 and to control circuit 60 of heat pump 30, as shown in FIG. 4.

Further, screen 141 also may be used to facilitate technician selection of balance point and LTCO temperature values in HVAC systems that may not include registry control of LTCO and balance point temperatures. In these embodiments, slide bar 124 may display incremental temperature values that may be applied through jumper settings. Slide bar 124 may facilitate selection of the appropriate settings and then once the settings are selected, a technician or installer may switch the jumper settings to the desired settings. In certain embodiments, GUI 46 may then include screens with instructions describing the adjustment of the jumper settings.

Screen 122 also may include a graphical element 158 that may be selected by a user to have controller 22 suggest LTCO and balance point temperature values. For example, controller 22 may display default temperature values determined by the factory or installer in response to selection of graphical element 158. The default values may be stored in memory 84 (FIG. 5). In another example, controller 22 may determine suggested temperature settings based on factors such as utility rates, geographical location, and expected temperatures. For example, controller 22 may receive utility rate information, such as electricity rates and fuel costs, from utility companies through a communication interface 92. In certain embodiments, the utility rate information may be stored within memory 84 (FIG. 5). Further, controller 22 may suggest settings based on factors such as furnace efficiency, heat pump efficiency, heat pump operating cost, heat pump heating capacity, expected heat loss from the structure, and the like. Further, controller 22 may suggest values based on the time of day or seasons. For example, utility rates may vary based on the time of day. In this example, controller 22 may suggest using a lower balance point temperature during the times of the day when electricity rates are lower. In response to selection of graphical element 158, controller 22 may retrieve and/or determine the suggested values and then may move sliders 130 and 132 to the suggested values.

In other embodiments, the shape, style, design, graphics, and the like of the graphical elements and/or the moveable features shown in FIG. 7 may vary. As shown in FIG. 7, the system transition temperatures that may be selected are shown on slide bar 124. However, in other embodiments, the graphical element representing the system transition temperatures may vary. For example, in certain embodiments, the temperature range may be shown on a virtual thermometer with sliders that may moved along the thermometer to adjust the balance point and LTCO temperatures. In another example, the temperature range may be displayed on a dial with moveable hands that a user may slide around the dial to adjust the temperature set points. Further, the shape, style, design, graphics, and the like shown within explanation area 141 may vary. For example, in a HVAC system that includes a heat pump and an electric heater instead of a furnace, indicator 152 may display the term "Electric Heat" instead of the term "Furnace."

Figure 8:
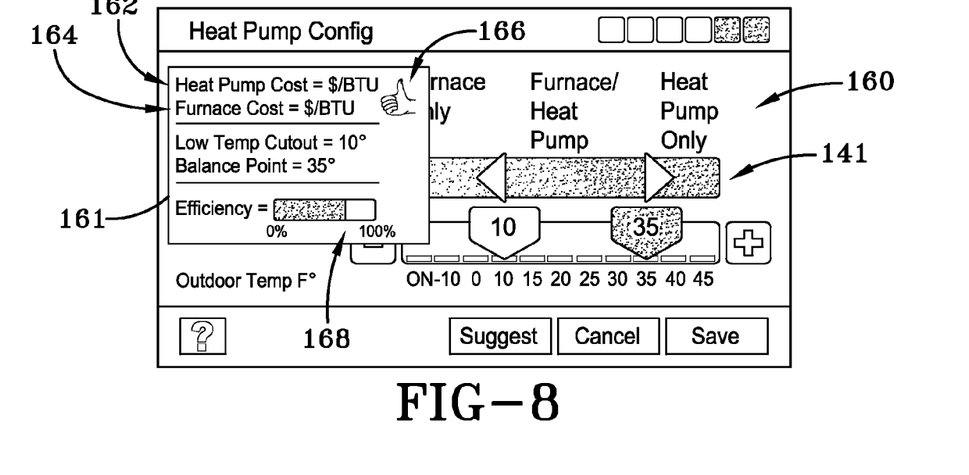
FIG. 8 is a view of another embodiment of a screen of the controller of FIG. 5 with a slide bar adjusting system transition temperatures.

FIG. 8 depicts another embodiment of a screen 160 that may be employed by a user to set the balance point temperature and the LTCO temperature. Screen 160 includes slide bar 124 and explanation area 141, as described above with respect to FIG. 7. Further, screen 160 includes a window 161 with indicators 162 and 164 that display cost information for the heat pump and furnace. Specifically, indicator 162 displays the cost of electricity for the heat pump, and indicator 164 displays the cost of gas for the furnace. The rate information displayed by indicators 162 and 164 may assist a user in deciding what values to select for the LTCO and balance point temperatures. For example, if the cost of electricity, as shown by indicator 162, is relatively low, a user may decrease the balance point temperature to allow the heat pump to run more often. In another example, if the cost of gas has dropped, a user may increase the LTCO set point temperature to allow the furnace to run more frequently.

In certain embodiments, an indicator 166 may be displayed next to the cost indicators 162 and 164 to notify a user when an energy rate is favorable. For example, as shown, indicator 165 is displayed next to the heat pump cost information 162 to indicate that the cost of electricity has decreased. In another example, another indicator, such as a thumbs down symbol, may be displayed when energy costs have risen. Screen 160 also may include an efficiency bar 168 that displays the operating efficiency of HVAC system 52 when HVAC system 52 is operating based on the selected LTCO and balance point temperatures. Controller 22 may adjust efficiency bar 168 as the LTCO and balance point temperatures are adjusted so that a user may see how changing the balance point temperature and LTCO temperature affects the operating efficiency of HVAC system 52.

Figure 9:
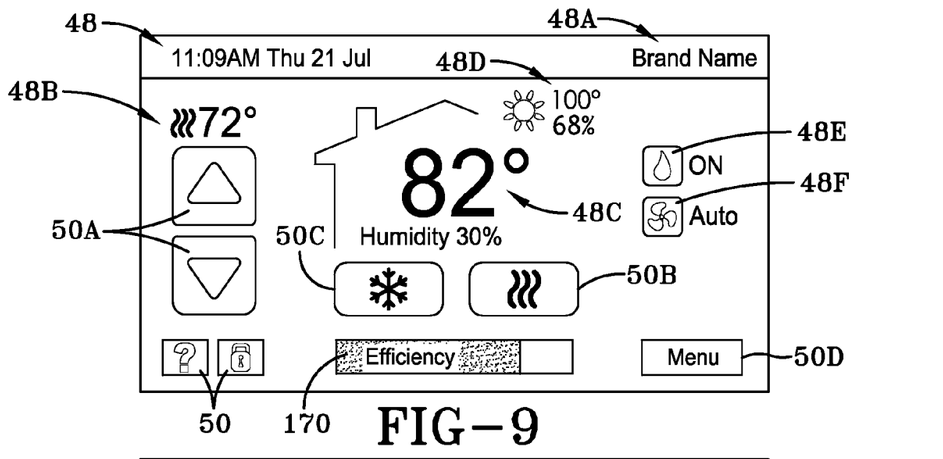
FIG. 9 is a view of a screen of the controller of FIG. 5 depicting an efficiency indicator.
Figure 10:
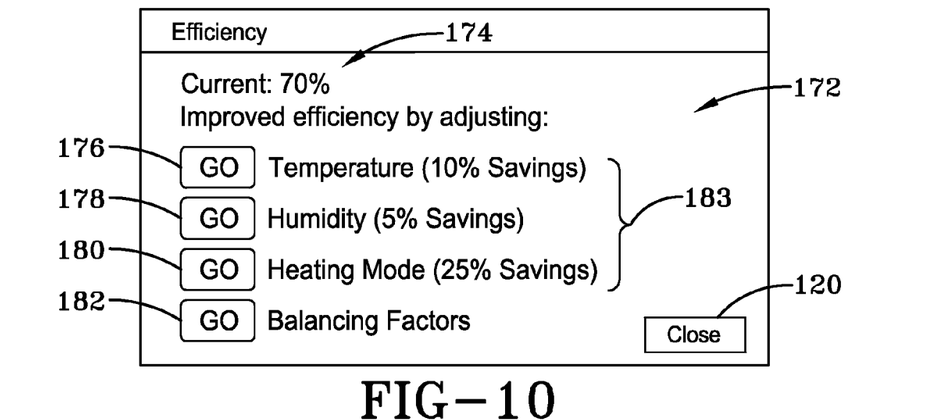
FIG. 10 is a view of a screen of the controller of FIG. 5 that may be employed for improving operating efficiency.
Figure 11:
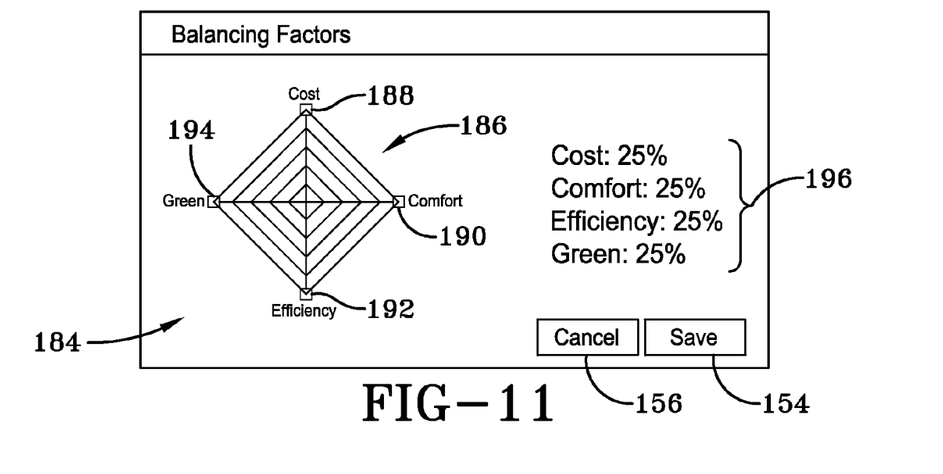
FIG. 11 is a view of another screen of the controller of FIG. 5 that may be employed for improving operating efficiency.

In addition to, or instead of displaying efficiency values based on the balance point and LTCO temperatures, controller 22 also may be used to communicate efficiency information to a user as shown in FIGS. 9 through 11. FIG. 9 depicts an embodiment of controller 22 that includes an efficiency indicator 170 displayed on a screen, such as a home screen of GUI 46. Efficiency indicator 170 may be a graphical and/or textual indicator that displays the current operating efficiency. For example, as shown, efficiency indicator 170 includes a bar graph that shows the current efficiency percentage at which HVAC system 52 is operating. According to certain embodiments, the persistent display of an efficiency value may increase user awareness of the efficiency of HVAC system 52, which, in certain embodiments may promote increased operating efficiency.

In certain embodiments, efficiency indicator 170 may include a graphical element that may be selected by the user to display tips for improving efficiency. For example, a user may select efficiency indicator 170 to display a screen 172 as shown in FIG. 10. A user also may access screen 172 through a menu of GUI 46. For example, as shown in FIG. 6, a user may select graphical element 110 to display screen 172. Returning to FIG. 10, screen 172 includes an indicator 174 that displays the current efficiency value. As shown, the efficiency is shown as a percentage of the maximum operating efficiency that may be maintained by HVAC system 52. However, in other embodiments, other values, such as power usage or an efficiency index value, may be displayed to communicate efficiency values to a user. For example, a power usage may be based on a combined index of compressor ratio, indoor unit fan power usage, and outdoor unit fan power usage, among others.

Screen 172 also may include graphical elements 176, 178, 180, and 182 that may be selected by a user to adjust settings to improve the operating efficiency. In certain embodiments, the graphical elements that are displayed may be based on an operating mode of HVAC system 52. For example, when the system is operating in cooling mode, graphical element 176 may direct the user to a screen for increasing the temperature set point. On the other hand, if the HVAC system is operating in a heating mode, graphical element 176 may direct the user to a screen and prompt the user to decrease the temperature set point. In another example, when the unit is operating in a cooling mode, graphical element 180 for adjusting the heating mode may not be displayed. Indicators 183 may be displayed next to graphical elements 176, 178, 180, and 182 that display the cost savings and/or efficiency savings that may be achieved by making the recommended adjustments. As shown, indicators 183 display cost savings values. However, in other embodiments, the indicators may display efficiency savings, environmental impact reduction values, or the like. When a user has finished adjusting settings to improve efficiency, a user may select graphical element 120 to return to the home screen.

FIG. 11 depicts a screen 184 that may allow a user to change the efficiency settings by balancing several different factors, such as cost, comfort, efficiency, and an environmental factor, or green index. In certain embodiments, a user may display screen 184 through selection of graphical element 182 (FIG. 10). Screen 184 includes a graph 186 that charts the designated factors. Although the factors are shown here as cost, comfort, efficiency, and a green index, any combination and number of a variety of factors may be displayed. Graph 186 may include adjustment features 188, 190, 192, and 194 that may be moved on touch screen 45 by a user to adjust the impact of each factor. For example, if a user desires to increase comfort, a user may move adjustment feature 190 to the right to increase the proportional effect that comfort preferences have on the operation of HVAC system 52. For example, when the comfort factor is increased, controller 22 may more tightly control the home to the temperature set point. Screen 184 also includes indicators 196 that display the current proportional value of each of the balancing factors 188, 190, 192, and 194. In certain embodiments, the green index may incorporate several values representing the environmental impact, such as carbon emissions, and energy consumption, among others. Graph 186 may generally allow a user to see how several factors are related to each other. For example, as a user increases adjustment feature 188 to reduce costs, adjustment feature 190 corresponding to comfort may decrease to indicate to a user that costs may be reduced at the expense of comfort.

Figure 12:
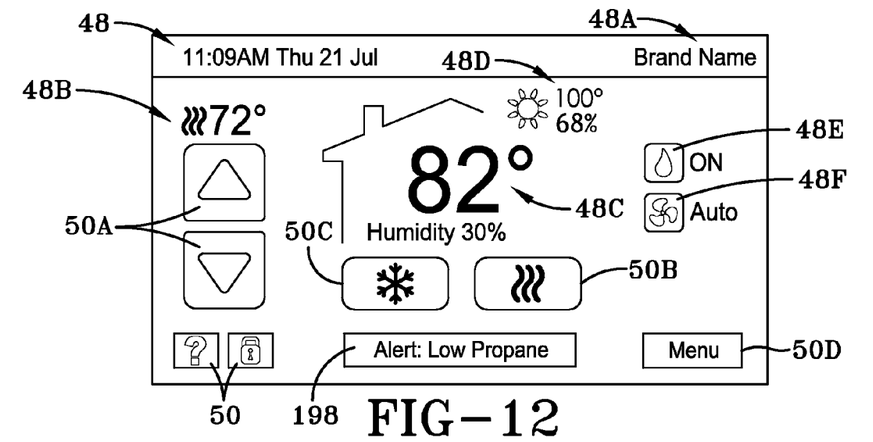
FIG. 12 is a view of a screen of the controller of FIG. 5 depicting a fuel alert.
Figure 13:
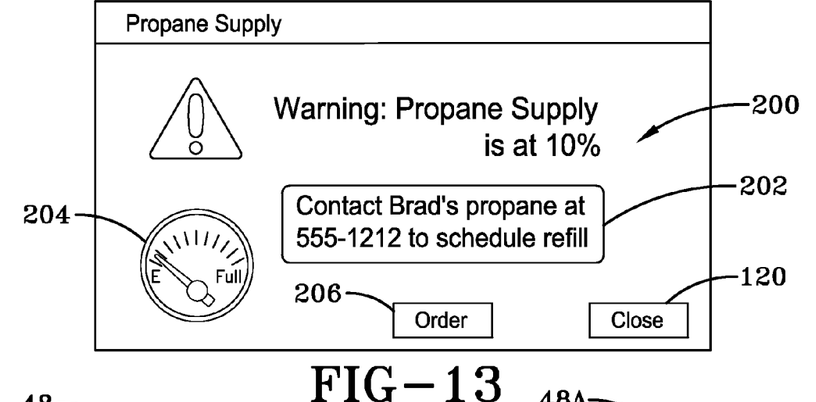
FIG. 13 is a view of another screen of the controller of FIG. 5 depicting a fuel alert.
Figure 14:
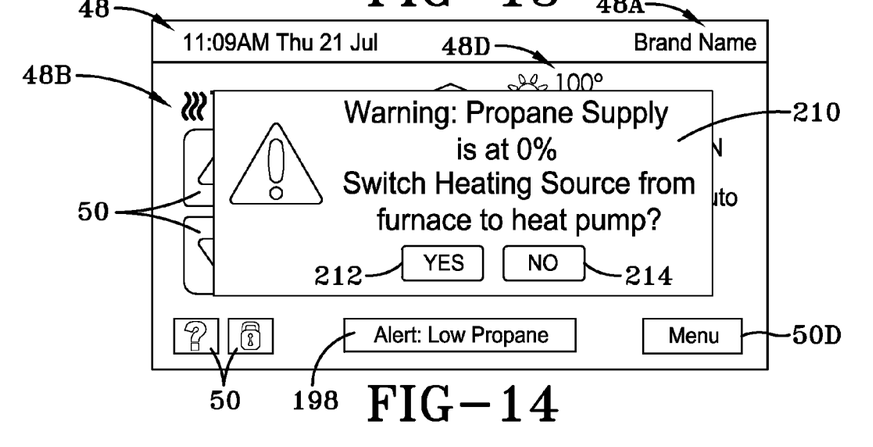
FIG. 14 is a view of another screen of the controller of FIG. 5 depicting a fuel alert.

As shown in FIGS. 12-14, controller 22 also may provide feedback to a user regarding a fuel supply for auxiliary heating system 54. For example, in certain embodiments, auxiliary heating system 54 may include a gas furnace supplied by an outdoor propane tank. In these embodiments, controller 22 may receive fuel information from a sensor 81 located on the remote fuel tank. Sensor 81 may measure the amount of fuel within the remote fuel tank and may provide this information to controller 22. Further, in other embodiments, the fuel level may be detected by a gas valve within the furnace and may be communicated to controller 22 through communication interface 92.

Controller 22 may then compare the fuel level to a predetermined low fuel threshold stored in memory 84 (FIG. 5). If controller 22 determines that the sensed fuel level is below the threshold, controller 22 may display an alert 198 on display 44. For example, as shown in FIG. 12, controller 22 may display and alert 198 on a screen of controller 22. The low fuel threshold values may be set by an installer, may be set at the factory, and/or may be set by a user. Controller 22 also may send alerts to an external device through communication interface 92. For example, controller 22 may send an alert to a user's computer or cell phone.

To obtain additional information about the fuel level, a user may select alert 198 to view a screen 200 as shown in FIG. 13. Screen 200 may display the current fuel level, which as shown is at ten percent. Screen 200 also may display a window 202 that includes information for ordering additional fuel. For example, window 202 may display the name of a propane dealer with contact information, such as a website, email address, or phone number. Screen 200 also may include a graphical indicator 204, such as a fuel gage, that represents the current fuel level. Further, screen 200 may include a graphical element 206 that may be selected by the homeowner to order more fuel. For example, in response to selection of graphical element 206, controller 22 may transmit an order request for more propane to a designated propane dealer through communication interface 92.

Controller 22 also may use information from sensor 81 to detect when auxiliary heating system 54 is out of fuel. Moreover, in other embodiments, auxiliary heating system 54 may include a flame sensing circuit that provides an indication to controller 22 when there is no flame. As shown in FIG. 14, controller 22 may display a pop up window 210 when the fuel supply is at zero percent. If controller 22 detects that HVAC system is using auxiliary heating system 54, controller 22 may suggest switching to an alternate heat source, such as a heat pump (i.e. outdoor unit 30). In certain embodiments, window 210 may include graphical elements 212 and 214 that may be selected by a user to confirm or decline switching to the alternative heat source. Moreover, in certain embodiments, controller 22 may automatically switch HVAC system 52 to the alternative heat source in response to detecting that there is no fuel. Further, in certain embodiments, controller 22 may ensure that operating conditions allow enablement of the alternative heat source prior to suggesting an alternative heat source and/or prior to enabling an alternative heat source. For example, controller 22 may verify that the outdoor temperature is high enough for compressor operation prior to suggesting operation of the heat pump. In another example, controller 22 may verify that the outdoor temperature is above the LTCO temperature. However, in certain embodiments, controller 22 may override the LTCO temperature set point and operate the heat pump when the outside temperature is below the LTCO upon detecting that there is no fuel. In these embodiments, the override feature may reduce impede damage to a residence due to cold interior temperatures. For example, automatic enablement of a heat pump when there is no fuel to operate the furnace may prevent frozen pipes.

Figure 15:
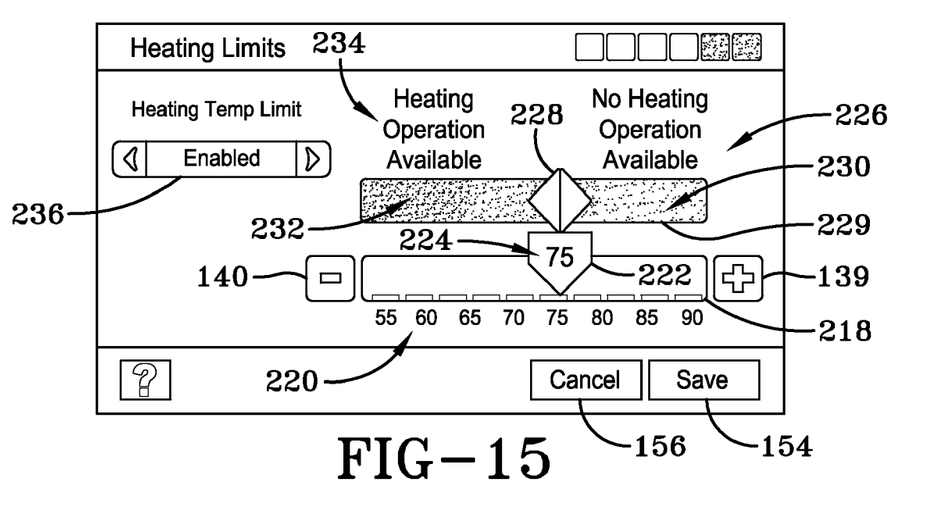
FIG. 15 is a view of another screen of the controller of FIG. 5 with a slide bar for adjusting system transition temperatures.

FIG. 15 depicts another embodiment of a screen 216 that may be employed by a user to adjust system transition temperatures. Specifically, a user may access screen 216 to adjust a system transition temperature that determines when HVAC system 52 may enable a heating mode. For example, an installer may set a transition temperature that specifies that HVAC system 52 should not operate in heating mode (i.e., operate a heat pump, electric heater, or furnace) when the outdoor temperature exceeds a certain temperature. In other embodiments, a similar screen may be employed to adjust a system transition temperature that determines when HVAC system 52 may enable a cooling mode. For example, an installer may set a transition temperature that specifies that HVAC system 52 should not operate in a cooling mode when the outdoor temperature is below a certain temperature. In certain embodiments, an installer may wish to specify that an air conditioner or heat pump may not operate in a cooling mode below a certain temperature to prevent damage to the compressor.

Screen 216 includes a graphical element, such as slide bar 218, of incremental temperature values 220 that may be selected as the system transition temperature for enabling a heating mode. Screen 216 includes a moveable feature, such as slider 222 that may be moved along slide bar 218 to adjust the system transition temperature. Slider 222 includes an indicator 224 that displays the currently selected temperature. A user may touch and drag slider 222 along slide bar 216 until the desired setting is reached. In addition to slider 222, a user may select graphical elements 139 and 140 to incrementally increase or decrease the selected value, as discussed above with respect to FIG. 7.

Screen 216 includes an explanation area 226 that may assist the user in setting the system transition temperature.

Explanation area 226 includes an indicator 228 that moves along a slide bar 229 that generally corresponds to slide bar 218. As a user moves slider 222 along slide bar 218, indicator 228 may move along slide bar 218 in a corresponding direction by a corresponding amount. Indicator 228 divides slide bar 1229 into two regions 230 and 232. Indicators 234 are shown above each region 230 and 232 and may identify whether heating operation is available for the corresponding region 230 and 232. Screen 216 also includes a graphical element 236 that may be selected to enable or disable the heating mode system transition temperature.

When a user has finished selecting the desired temperature value, a user may select a graphical element 154 to save the changes. If a user wishes to cancel the changes, a user may select a graphical element 156. Controller 22 may then apply the temperature settings to HVAC system 52. For example, as shown in FIG. 5, controller 22 may store the new settings in a corresponding control registry of controller 22. Further, in certain embodiments, the controller may send the registry values to control circuit 58, 60, or 62 for backup storage.

In general, the screens depicted in FIGS. 7-15 may facilitate user understanding of balance point temperatures, LTCO temperatures, and/or operation of auxiliary heating system 54. The screens depicted in FIGS. 7-15 may be used by a homeowner to make adjustments, by an installer during installation, or by a technician during a service call. Moreover, the relative sizes, shapes, and configurations of the graphical elements shown herein may vary depending on system functionality, user preference, and/or system equipment, among others. Further, the transition temperature adjustments depicted in FIGS. 7-15 may be employed in HVAC systems with heat pumps and furnaces, with heat pumps and electric heat, with air conditioners and furnaces, or with air conditioners and electric heat, among others. Moreover, the efficiency indicators depicted in FIGS. 7-15 may be employed to facilitate efficiency based adjustments in HVAC systems with heat pumps, air conditioners, furnaces, electric heaters, or combinations thereof and/or to make adjustments to HVAC systems operating in a heating mode, a cooling mode, or both.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A control device comprising:
a communication interface suitable for operable connection to a heat pump, an auxiliary heating system, and a sensor capable of sensing an exterior temperature;
a display configured to display a graphical element that defines a range of possible system transition temperatures, a first moveable feature disposed on the graphical element that identifies a balance point temperature that corresponds to the exterior temperature below which the control device enables the auxiliary heating system, and a second moveable feature disposed on the graphical element that identifies a low cutout temperature that corresponds to the exterior temperature below which the control device disables the heat pump;
a graphical user interface configured to receive a first user input that moves the first moveable feature on the graphical element to select the balance point temperature from the range of possible system transition temperatures and a second user input that moves the second moveable feature on the graphical element to select the low cutout temperature from the range of possible system transition temperatures, wherein the graphical user interface comprises a screen configured to display an explanation area adjacent to the graphical element, and wherein the explanation area comprises a slide bar having a first element and a second element that together divide the slide bar into separate regions comprising an auxiliary heating region where only the auxiliary heating system is enabled, a heat pump region where only the heat pump is enabled, and a combination region where both the auxiliary heating system and the heat pump are enabled; and
a processor configured to selectively enabling the auxiliary heating system and the heat pump based upon the selected balance point temperature, the selected low cutout temperature, and the sensed exterior temperature.

2. The control device of claim 1, wherein the display comprises a touch screen for sensing the user input.

3. The control device of claim 1, wherein the graphical element comprises an additional slide bar and wherein the moveable feature comprises a slider.

4. The control device of claim 1, wherein the display is configured to display indicators adjacent to the graphical element to identify portions of the graphical element.

5. The control device of claim 1, wherein the range comprises at least 10 possible system transition temperatures.

6. The control device of claim 1, wherein the processor is configured to determine a suggested system transition temperature based on model information for the heat pump, model information for the auxiliary heating system, or an operating efficiency for the heat pump, or combinations thereof 7. The control device of claim 1, wherein the auxiliary heating system comprises an electric heater or a fossil fuel furnace.

8. The control device of claim 1, wherein the processor is configured to determine a suggested system transition temperature based on electricity cost and fuel cost data.

9. The control device of claim 1, wherein the balance point temperature corresponds to the exterior temperature above which the processor disables the auxiliary heating system and wherein the low cutout temperature corresponds to the exterior temperature above which the processor enables the heat pump.

10. The control device of claim 1, wherein the processor is configured to determine whether a minimum temperature difference exists between the balance point temperature and the low cutout temperature.

11. A control device comprising:
a communication interface suitable for operable connection to a heat pump, an auxiliary heating system, and a sensor capable of sensing an exterior temperature;
a display configured to display a balance point temperature that corresponds to the exterior temperature below which the control device enables the auxiliary heating system, a low cutout temperature that corresponds to the exterior temperature below which the control device disables the heat pump, a slide bar that defines a range of possible balance point temperatures and a range of possible low cutout temperatures, a first moveable slider disposed on the slide bar to identify the balance point temperature, and a second moveable slider disposed on the slide bar to identify the low cutout temperature;
a graphical user interface configured to receive a first user input that moves the first moveable slider along the slide bar to select the balance point temperature from the range of possible balance point temperatures and a second user input that moves the second moveable slider along the slide bar to select the low cutout temperature from the range of possible low cutout temperatures, wherein the graphical user interface comprises a screen configured to display an explanation area adjacent to the slide bar, and wherein the explanation area comprises an additional slide bar having a first element and a second element that together divide the additional slide bar into separate regions comprising an auxiliary heating region where only the auxiliary heating system is enabled, a heat pump region where only the heat pump is enabled, and a combination region where both the auxiliary heating system and the heat pump are enabled; and
a processor configured to receive the exterior temperature from the sensor and configured to selectively enable the auxiliary heating system and the heat pump based upon the selected balance point temperature, the selected low cutout temperature, and the sensed exterior temperature.

12. The control device of claim 11, wherein the display comprises a touch screen for sensing the user input.

13. The control device of claim 11, wherein the graphical user interface comprises an additional screen for displaying indicators adjacent to the slide bar.

14. The control device of claim 11, wherein the communication interface comprises a network interface capable of receiving energy cost data and wherein the processor is capable of determining a suggested balance point temperature and a suggested low cutout temperature based on the energy cost data.

15. The control device of claim 11, wherein the communication interface comprises a network interface capable of receiving geographic location data and wherein the processor is configured to determine a suggested balance point temperature and a suggested low cutout temperature based on the geographic location data.

16. The control device of claim 11, wherein the processor is configured to determine a suggested balance point temperature and a suggested low cutout temperature based on at least one of operating efficiency, operating cost, or operating capacity.

17. The control device of claim 11, wherein the processor is configured to determine whether the difference between the selected balance point temperature and the selected low cutout temperature is greater than a predetermined value.

18. The control device of claim 11, wherein the processor is configured to disable the auxiliary heating system in response to determining that the exterior temperature is above the balance point temperature and to disable the heat pump in response to determining that the exterior temperature is below the low cutout temperature.

19. The control device of claim 11, wherein the first element is configured to move along the additional slide bar in a manner corresponding to movement of the first moveable slider and the second element is configured to move along the additional slide bar in a manner corresponding to movement of the second moveable slider.

20. A method, comprising:
displaying a first moveable element on a range of selectable temperatures, wherein the first moveable element identifies a balance point temperature;
displaying a second moveable element on the range of selectable temperatures, wherein the second moveable element identifies a low cutout temperature;
sensing a first touch that moves the first moveable element to select the balance point temperature from the range of selectable temperatures;
sensing a second touch that moves the second moveable element to select the low cutout temperature from the range of selectable temperatures;
assigning the balance point temperature and the low cutout temperature to a heating system, wherein the heating system operates a heat pump and another heating device based upon the selected balance point temperature and the selected low cutout temperature; and
displaying an explanation area adjacent to the range of selectable temperatures, wherein the explanation area comprises a third moveable element and a fourth moveable element that together divide the explanation area into separate regions comprising an auxiliary heating region where only the auxiliary heating system is enabled, a heat pump region where only the heat pump is enabled, and a combination region where both the auxiliary heating system and the heat pump are enabled.

21. The method of claim 20, wherein assigning the balance point temperature and the low cutout temperature comprises determining that the balance point temperature is greater than the low cutout temperature.

22. The method of claim 20, wherein assigning the balance point temperature and the low cutout temperature comprises determining that the temperature difference between the balance point temperature and the low cutout temperature exceeds a predetermined value.

23. The method of claim 20, comprising moving the third moveable element in a manner corresponding to movement of the first moveable element and moving the fourth moveable element in a manner corresponding to movement of the second moveable element.

24. The method of claim 20, wherein the range of selectable temperatures comprises a slide bar, and wherein the first moveable element and second moveable element comprise sliders.

25. The method of claim 20, wherein the balance point temperature corresponds to the exterior temperature below which the control device enables the another heating device and wherein the low cutout temperature corresponds to the exterior temperature below which the control device disables the heat pump.

* * * * *